United States Patent
Zheng et al.

(10) Patent No.: US 12,005,656 B2
(45) Date of Patent: Jun. 11, 2024

(54) PROTECTIVE CASE FOR ELECTRONIC DEVICE AND METHOD FOR MANUFACTURING THE SAME

(71) Applicant: Shenzhen Lingyi Innovation Technology Co., Ltd, Shenzhen (CN)

(72) Inventors: Yanghui Zheng, Shenzhen (CN); Sen Qiu, Shenzhen (CN); Yanghong Zheng, Shenzhen (CN); Jingyan Zheng, Shenzhen (CN); Qiushun Liu, Shenzhen (CN); Shaohua Chen, Shenzhen (CN)

(73) Assignee: Shenzhen Lingyi Innovation Technology Co. Ltd., Shenzhen (CN)

( * ) Notice: Subject to any disclaimer, the term of this patent is extended or adjusted under 35 U.S.C. 154(b) by 0 days.

(21) Appl. No.: 18/365,436

(22) Filed: Aug. 4, 2023

(65) Prior Publication Data
US 2024/0042709 A1    Feb. 8, 2024

(30) Foreign Application Priority Data
Aug. 5, 2022  (CN) .......................... 202210939013.X (51) Int. Cl.
*B29C 70/70*      (2006.01)
*A45C 11/00*      (2006.01)
(Continued)

(52) U.S. Cl.
CPC .............. *B29C 70/70* (2013.01); *A45C 11/00* (2013.01); *B29C 51/08* (2013.01); *B29C 51/14* (2013.01); *B29C 51/264* (2013.01); *B29C 70/88* (2013.01); *B32B 3/08* (2013.01); *B32B 3/266* (2013.01); *B32B 5/02* (2013.01); *B32B 5/26* (2013.01); *B32B 37/04* (2013.01); *B32B 37/06* (2013.01); *B32B 37/10* (2013.01); *B32B 37/18* (2013.01); *B32B 37/26* (2013.01); *B32B 38/0004* (2013.01); *A45C 2011/002* (2013.01); *A45C 2011/003* (2013.01); *B29K 2105/0097* (2013.01); *B29K 2277/10* (2013.01);
(Continued)

(58) Field of Classification Search
CPC ......... B29C 70/70; B32B 3/266; H04M 1/185
See application file for complete search history.

(56) References Cited

U.S. PATENT DOCUMENTS

| | | | |
|---|---|---|---|
| 2009/0189818 A1* | 7/2009 | Yang | H01Q 1/40 343/702 |
| 2014/0308869 A1* | 10/2014 | Seyboth | B32B 5/024 442/286 |
| 2022/0094382 A1* | 3/2022 | Cole | H04B 1/3888 |

\* cited by examiner

*Primary Examiner* — Christopher T Schatz
(74) *Attorney, Agent, or Firm* — Michael P. Furmanek (57) ABSTRACT

The present disclosure relates to the technical field of protective case, in particular to a protective case for electronic device and a method for manufacturing the same. The protective case for electronic device includes an inner shell, an outer shell, and a magnetic interlayer that fits and in contact with the inner shell and the outer shell, wherein: the magnetic interlayer includes an interlayer base material and a magnetic part, the magnetic interlayer is provided with a through installation hole, and the magnetic part is fixedly embedded in the installation hole, the thickness of the magnetic part matches with the depth of the installation hole, the interlayer base material includes a hot-melt base material and reinforcing fiber yarn contained in the hot-melt base material, and the hot-melt base material is filled between the magnetic part and the inner side wall of the installation hole.

16 Claims, 6 Drawing Sheets

(51) Int. Cl.
*B29C 51/08* (2006.01)
*B29C 51/14* (2006.01)
*B29C 51/26* (2006.01)
*B29C 70/88* (2006.01)
*B32B 3/08* (2006.01)
*B32B 3/26* (2006.01)
*B32B 5/02* (2006.01)
*B32B 5/26* (2006.01)
*B32B 37/04* (2006.01)
*B32B 37/06* (2006.01)
*B32B 37/10* (2006.01)
*B32B 37/18* (2006.01)
*B32B 37/26* (2006.01)
*B32B 38/00* (2006.01)
B29K 105/00 (2006.01)
B29K 277/00 (2006.01)
B29K 309/08 (2006.01)
B29L 31/34 (2006.01)

(52) U.S. Cl.
CPC .. *B29K 2309/08* (2013.01); *B29K 2995/0008* (2013.01); *B29L 2031/3481* (2013.01); *B32B 2037/268* (2013.01); *B32B 2260/021* (2013.01); *B32B 2260/046* (2013.01); *B32B 2262/0269* (2013.01); *B32B 2262/101* (2013.01); *B32B 2305/076* (2013.01); *B32B 2307/208* (2013.01); *B32B 2307/7376* (2023.05); *B32B 2309/02* (2013.01); *B32B 2309/04* (2013.01); *B32B 2315/085* (2013.01); *B32B 2377/00* (2013.01); *B32B 2457/00* (2013.01); *B32B 2571/00* (2013.01)

PROTECTIVE CASE FOR ELECTRONIC DEVICE AND METHOD FOR MANUFACTURING THE SAME

CROSS REFERENCE

The present disclosure claims priority of Chinese Patent Application No. 202210939013.X, filed on Aug. 5, 2022, the entire contents of which are hereby incorporated by reference in their entirety.

TECHNICAL FIELD

The present disclosure relates to the technical field of protective case, in particular to a protective case for electronic device and a method for manufacturing the same.

BACKGROUND

For convenience of firm attachment, more and more electronic device protective cases are embedded with magnetic parts. For example, to facilitate wireless charging of the mobile phone through the mobile phone protective case, magnetic parts are embedded in the thin-walled structure of the mobile phone protective case. However, the technical threshold for electronic device protective cases is not high, and the competition is becoming increasingly fierce. Even with embedded magnetic parts, electronic device protective cases still need to be sufficiently light, thin and have high-quality appearance in order to establish an effective competitive advantage.

In order to facilitate the embedding of the magnetic part, an existing manufacturing method of a protective case for electronic device includes directly placing the magnetic part on the interlayer base material, and then use hot-melt adhesive to fix the magnetic part and the interlayer base material, finally the front and back of the obtained component are fixed by thermo compression with the inner shell and the outer shell through a glue covering layer, in order to eliminate the height difference between the magnetic parts and the interlayer base material. However, due to the fact that there is a height difference between the magnetic part and the interlayer base material, and the deformation of the interlayer base material and the glue covering layer is difficult to control, this solution not only makes the thickness of the electronic device protective case larger, but also causes an impression occurs on the electronic device protective case at the position corresponding to the magnetic part, which negatively affect the appearance texture.

In order to solve the technical problem of large deformation in heat-pressing process, Korean patent document KR102248166B1 discloses a method for manufacturing an electronic device protective case without heat-pressing process. This manufacturing method involves opening a "blind hole" on the interlayer base material, then install the magnetic part in the blind hole, take two cover plates and coat the inner surface of the two cover plates with adhesive, and then place the interlayer base with the magnetic part between two cover plates, the adhesive coated on the cover plate can flow into the blind hole. Due to the relatively low curing temperature of the adhesive, the deformation of the two cover plates is small, but due to the superimposition of the magnetic part and the bottom wall of the blind hole, the product manufactured by this method is still thick. In addition, because the amount of adhesive flowing into the blind hole is difficult to control, therefore, there may still be embossing or debossing on cover plate at the position corresponding to the magnetic part, the appearance and texture are still not ideal.

SUMMARY OF THE DISCLOSURE

The main purpose of this application is to propose a protective case for electronic device, a method for manufacturing a magnetic interlayer and a method for manufacturing a protective case for an electronic device. The methods aim to solve the technical problem that the magnetic interlayer product produced by the existing magnetic clamping manufacturing method is relatively thick, and when it is used in a protective case of an electronic device, it would cause an impression to occur on the protective case.

To achieve the above objective, certain aspects of the present disclosure provide a protective case for electronic device, comprising: an inner shell, an outer shell, and a magnetic interlayer that fits and contacts the inner shell and the outer shell, wherein: the magnetic interlayer includes an interlayer base material and a magnetic part, the magnetic interlayer is provided with a through installation hole, and the magnetic part is fixedly embedded in the installation hole, the thickness of the magnetic part matches with the depth of the installation hole, the interlayer base material includes a hot-melt base material and reinforcing fiber yarn contained in the hot-melt base material, and the hot-melt base material is filled between the magnetic part and the inner side wall of the installation hole, wherein the hot-melt base material filled between the magnetic part and the installation hole is formed by melting of the interlayer base material after heating, the surface of the magnetic interlayer is kept flat by hot pressing.

In some implementations, the inner shell and the outer shell are made of aramid fiber, the reinforcing fiber yarn is a glass fiber yarn, and the hot-melt base material is resin. In some implementations, the inner shell, the outer shell and the reinforcing fiber yarn are made of aramid fiber, and the hot-melt base material is resin.

In some implementations, the magnetic interlayer is produced according to the following steps:

S100: opening the through installation hole on the interlayer base material;
S200: laying a first release film on the upper surface of the lower shaping mold;
S300: laying the interlayer base material obtained in step S100 on the first release film;
S400: embedding the magnetic part in the installation hole of the interlayer base material;
S500: laying a second release film on the upper surface of the assembly obtained in step S400;
S600: covering an upper shaping mold on the upper surface of the second release film;
S700: packing the assembly obtained in step S600 into the first flexible container;
S800: performing air extraction processing on the first flexible container, and sealing the first flexible container after the air extraction processing is completed;
S900: putting the first flexible container and the contents of the first flexible container into an autoclave, after the autoclave is sealed, inflate and pressurize the autoclave, and the assembly obtained in step S800 are heated for a predetermined duration;
S1000: stop heating the assembly obtained in step S900, when the assembly cools to a preset temperature, taking out the semi-finished magnetic interlayer product between the first release film and the second release film;

S1100: cutting the semi-finished magnetic interlayer obtained in step S1000 to obtain a magnetic interlayer with a preset dimension.

In some implementations, the reinforcing fiber yarn is a glass fiber yarn, the hot-melt base material is resin; in the step S900, heating the assembly obtained in the step S800 for a preset duration specifically includes: heating the assembly obtained in step S800 from the initial temperature to 125 degrees Celsius and maintain for 15 minutes, then heating to 135 degrees Celsius and maintain for 40 minutes.

In some implementations, in the step S900, heating the assembly obtained in the step S800 for a preset duration specifically includes: heating the assembly obtained in step S800 from the initial temperature to 100-130 degrees Celsius and maintain for 10-20 minutes, then heating to 130-160 degrees Celsius and maintain for 30-50 minutes.

In some implementations, the process of inflating and pressurizing the autoclave in step S900 specifically includes: performing inflation and pressurization treatment on the autoclave so that the pressure in the autoclave is within the range of [0.4, 0.8] MPa.

In some implementations, the lower shaping mold and the upper shaping mold are both plate-shaped; the first flexible container is a metal foil bag, and is in an empty exhaust state, the first flexible container is sheet-shaped.

In some implementations, the first flexible container is a tin foil bag.

In some implementations, the interlayer base material comprises a plurality of mutually stacked sheets, the sheets include a hot-melt base material and reinforcing fiber yarn contained in the hot-melt matrix; the installation hole includes an annular hole, and the step S100 specifically includes:

Step S110: stacking a plurality of sheets to form an interlayer base material of preset thickness;

Step S120: punching through each sheet to form the installation hole.

In some implementations, the magnetic part comprises a main adsorption part, the main absorbing part includes a plurality of main magnetic attracting parts and an annular film connecting the multiple main magnetic attracting parts into a ring shape; the S400 specifically includes:

Embedding the main absorbing part in the annular hole of the interlayer base material.

Certain aspects of the present disclosure provide a method of manufacturing a protective case for an electronic device comprising:

P100: stacking a magnetic interlayer between an inner shell and an outer shell, wherein the magnetic interlayer includes an interlayer base material and a magnetic part, the magnetic interlayer is provided with a through installation hole, and the magnetic part is fixedly embedded in the installation hole, the thickness of the magnetic part matches with the depth of the installation hole, the interlayer base material includes a hot-melt base material and reinforcing fiber yarn contained in the hot-melt base material, and the hot-melt base material is filled between the magnetic part and the inner side wall of the installation hole, wherein the hot-melt base material filled between the magnetic part and the installation hole is formed by melting of the interlayer base material after heating, the surface of the magnetic interlayer is kept flat by hot pressing;

P200: putting the assembly obtained in step P100 into a second flexible container;

P300: carrying out air extraction process on the second flexible container, and sealing the second flexible container after the air extraction process is completed;

P400: putting the second flexible container and the contents of the second flexible container together into an autoclave, and after the autoclave is sealed, inflate and pressurize the autoclave, heating the assembly obtained in step P300 for a preset duration;

P500: stop heating until the temperature of the assembly obtained in step P400 drops to a preset temperature, taking out the electronic device protection case in the second flexible container.

In some implementations, initial shapes of the inner layer shell and the outer layer shell are flat plate shapes, the following steps are included between step P100 and step P200:

P110: placing the assembly obtained in step P100 on a drawing die;

P120: placing a drawing core mold at a preset position on the upper surface of the assembly obtained in step P100, the size of the drawing core mold is compatible with the cavity size of the electronic device protective case;

P130: pressing the drawing core mold into the inner cavity of the drawing die;

P140: clamping the drawing core mold and the assembly obtained in step P130 in a tightening member, so that the assembly obtained in step P130 maintains a preset deformation state relative to the drawing core mold;

wherein the step P200 specifically includes:

Placing the tightening member, the drawing core mold and the assembly obtained in step P130 into the second flexible container.

In some implementations, the tightening member is a silicone bag, the second flexible container is a tin foil bag, and when in an empty and exhaust state, the second flexible container is in sheet shape.

Certain aspects of the present disclosure provide a manufacturing method of magnetic interlayer, the magnetic interlayer includes an interlayer base material and a magnetic part, the magnetic interlayer is provided with a through installation hole, and the magnetic part is fixedly embedded in the installation hole, the magnetic interlayer is produced according to the following steps:

S100: opening the through installation hole on the interlayer base material;

S200: laying a first release film on the upper surface of a lower shaping mold;

S300: laying the interlayer base material obtained in step S100 on the first release film;

S400: embedding the magnetic part in the installation hole of the interlayer base material;

S500: laying a second release film on the upper surface of the assembly obtained in step S400;

S600: covering an upper shaping mold on the upper surface of the second release film;

S700: packing the assembly obtained in step S600 into a first flexible container;

S800: performing air extraction processing on the first flexible container, and seal the first flexible container after the air extraction processing is completed;

S900: putting the first flexible container and the contents of the first flexible container into an autoclave, and after the autoclave is sealed, inflating and pressurizing the autoclave, and heating the assembly obtained in step S800 for a predetermined duration;

S1000: stop heating the assembly obtained in step S900, when the assembly cools to a preset temperature, taking out the semi-finished magnetic interlayer product between the first release film and the second release film;

S1100: cutting the semi-finished magnetic interlayer obtained in step S1000 to obtain a magnetic interlayer with a preset dimension.

The magnetic interlayer of the present application adopts the interlayer base material that is provided with reinforcing fiber yarn, and offers the installation hole that runs through the interlayer base material, the initial thickness is small. In some implementations, the obtained components are clamped in the shaping molds, then the assembly and the shaping molds are put into a flexible container, and then the flexible container is sealed after air extraction, then the flexible container and its contents are put into an autoclave for heat pressing treatment, so that the hot-melt base material contained in the interlayer base material can flow sufficiently, fill into the gap between the installation hole and the magnetic part, and because atmospheric pressure is transmitted through the shaping molds (upper shaping mold and lower shaping mold), and reinforced fiber yarn restricts the flow deformation of the hot-melt base material, while ensuring the distribution force, it can ensure the flatness of the semi-finished magnetic interlayer product during the hot pressing process, so that after cooling, a sheet material with smooth surface is obtained where the interlayer base material and the magnetic part are integrated. The manufacturing method of the magnetic interlayer of the present application adopts the interlayer base material with reinforced fiber yarn, clamping and outgassing are performed on the semi-finished product before the heat pressing treatment, the magnetic interlayer thus prepared has a small thickness, a firm structure and is not prone to deformation, it can be used for the manufacture of electronic device protective cases. The magnetic interlayer can obtain thinner electronic device protective cases without impression of magnetic part, and achieve improved appearance and texture.

BRIEF DESCRIPTION OF THE DRAWINGS

In order to more clearly illustrate the technical solution of the embodiments of the present application, the accompanying drawings used in the description of the embodiments will be briefly introduced below, obviously, the accompanying drawings in the following description are only some of the embodiments of the present application, for those skilled in the art, other drawings can also be obtained according to these drawings without involving inventive work.

DETAILED DESCRIPTION

In conjunction with the accompanying drawings in the embodiments of the application, the technical scheme in the embodiment of the application is described, described embodiments are only part of the embodiments of the application, not covering all implementation examples. Based on the embodiments in this application, all other embodiments obtained by persons of ordinary skill in the art without creative efforts fall within the protection scope of this application.

Figure 1:
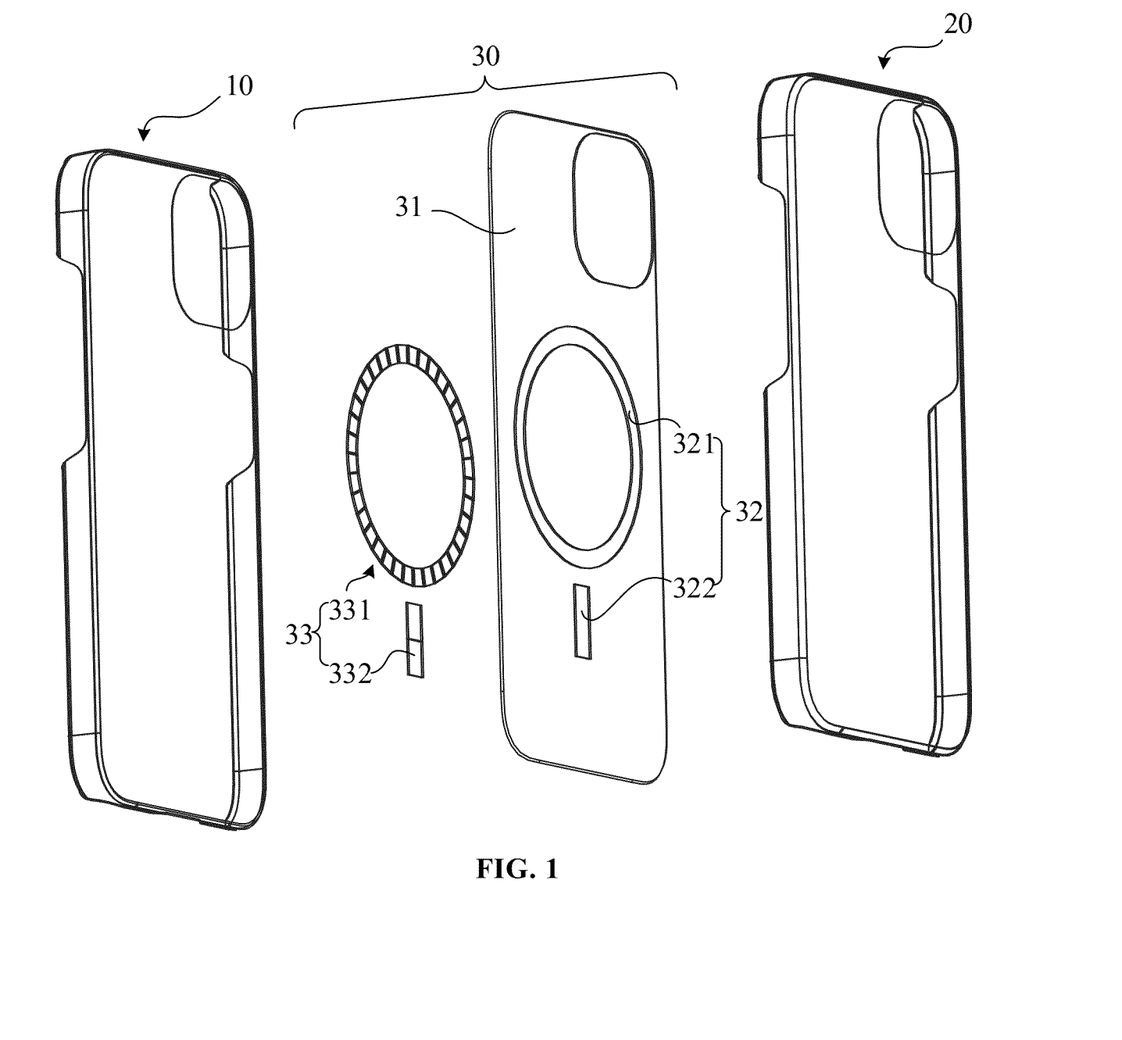
FIG. 1 is the exploded structure schematic diagram of the electronic device protective case that is manufactured according to the manufacturing method of the electronic device protective case of the present application.

In order to achieve the above objective, the application proposes a manufacturing method of a magnetic interlayer, with reference to FIG. 1, in one embodiment, the magnetic interlayer is part of a protective case that also includes an outer shell and an inner shell, the magnetic interlayer 30 comprises an interlayer base material 31 and a magnetic part 32, and the magnetic interlayer is provided with a through installation hole 33, the magnetic part 32 is fixedly embedded in the installation hole 33. The function of the interlayer base material 31 is to compensate the height difference between the magnetic part 32 and an outer shell as well as an inner shell, the thickness of the magnetic part matches the depth of the installation hole. The installation hole 33 is a through hole so that the thickness of the magnetic interlayer can be minimized. The magnetic part is used for attaching with an electronic device, and the magnetic part can be a magnet or an ordinary iron material.

Figure 2:
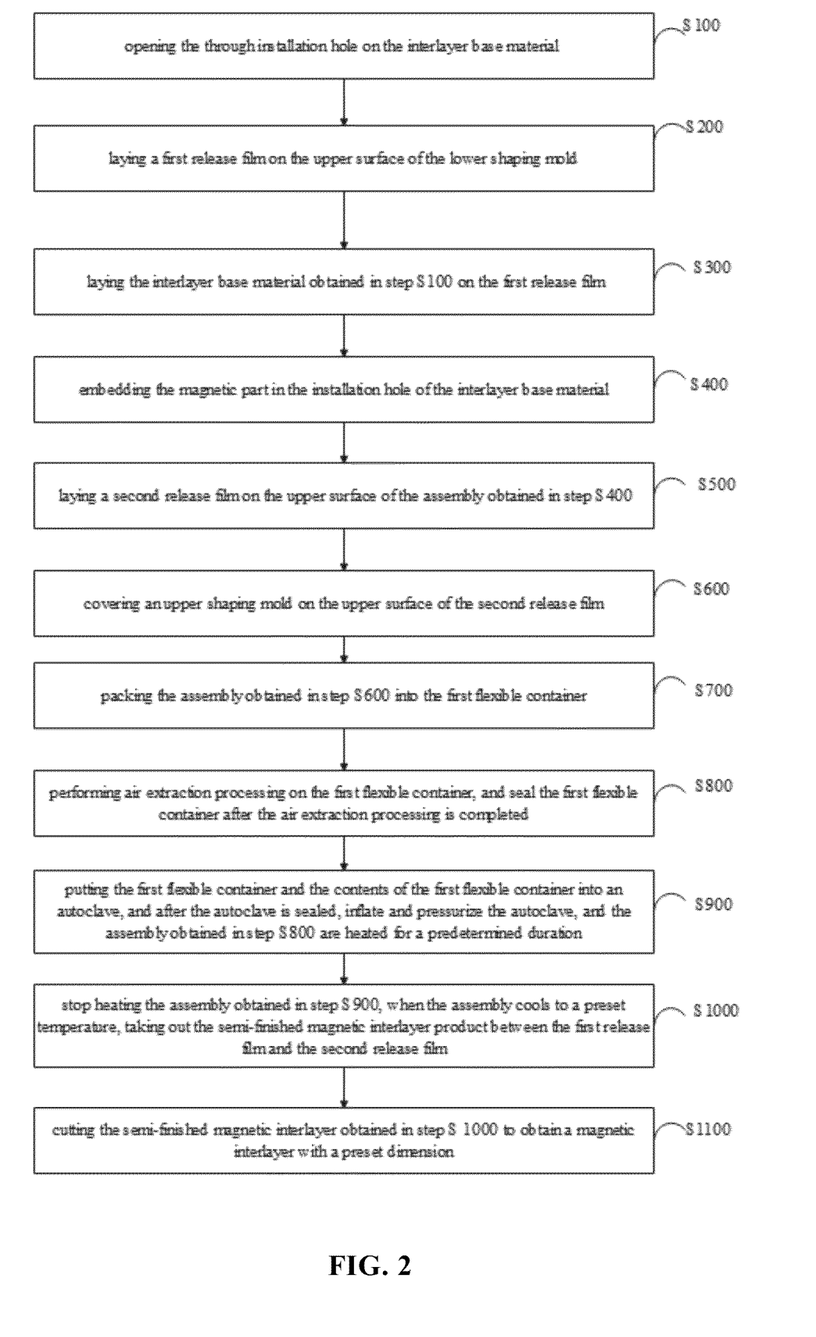
FIG. 2 is the schematic flowchart of the first embodiment of the manufacturing method of magnetic interlayer of the present application.

FIG. 2 is the schematic flowchart of the first embodiment of the manufacturing method of magnetic interlayer of the present application, with reference to FIG. 2, in the first embodiment, the manufacturing method of the magnetic interlayer comprises:

S100: opening a through installation hole on interlayer base material, the interlayer base material comprises hot-melt base material and reinforcing fiber yarn contained in the hot-melt base material;

The reinforcing fiber yarn can limit the flow of the hot-melt base material in a heated state, thereby ensuring the uniformity of the thickness of the base material during processing. As an example, the hot-melt base material can be epoxy resin, and the reinforcing fiber yarn can be glass fiber or aramid fiber. In some embodiments, the interlayer base material may include one or more sub-layers of reinforcing fiber yarn, each sub-layer of reinforcing fiber yarn may have a thickness as low as 0.1 mm.

In some embodiments, the magnetic interlayer is part of a protective case that also includes an outer shell and an inner shell, the inner shell and the outer shell have substantially the same ductility level as the reinforcing fiber yarn, the change patterns of the ductility levels of the inner shell, the outer shell and the reinforcing fiber yarn may be substantially the same as temperature changes, thereby avoid deformation of the protective case under normal operating temperatures of the electronic device. In some embodiments, the inner shell and the outer shell have substantially the same resin compatibility level as the reinforcing fiber yarn, thereby consistent firmness could be achieved for different parts of the protective case, meanwhile, separation and splitting between the inner shell, the magnetic interlayer, and the outer shell can be avoided. In some embodiments, the thickness of the inner shell is 0.25 mm-0.5 mm, the thickness of the outer shell is 0.25 mm-0.5 mm, the thickness of the magnetic interlayer is 0.1 mm-0.5 mm.

S200: laying a first release film on the upper surface of a lower shaping mold;

S300: laying the interlayer base material obtained in step S100 on the first release film;

By employing the first release film, it is convenient to separate the interlayer base material from the lower shaping mold in the follow-up process.

S400: Embedding the magnetic part in the installation hole of the interlayer base material;

It can be understood that after the magnetic part is loaded into the installation hole, there is a certain gap between the magnetic part and the inner wall of the installation hole, but the hot-melt base material softened in the subsequent operation can fill the gap, thereby after cooling, fixed attachment between the magnetic part and the interlayer base material is realized.

S500: laying a second release film on the upper surface of the assembly obtained in step S400;

S600: covering a upper shaping mold on the upper surface of the second release film;

Similar as applying the first release film, by applying the second release film, it is convenient to separate the interlayer base material and the upper shaping mold in the follow-up process. The upper shaping mold and the lower shaping mold can have an clamping effect on the assembly obtained in step S400, so as to shape the assembly during the hot pressing process and keep the assembly flat. It can be understood that the upper shaping mold and the lower shaping mold have an upper shaping plane and a lower shaping plane respectively, and there is no limitation on the shape of the shaping mold.

S700: packing the assembly obtained in step S600, the upper shaping mold, the first release film, the second release film and the lower shaping mold together into a first flexible container;

S800: carrying out air extraction processing on the first flexible container, and sealing the first flexible container after the air extraction processing is completed;

By degassing the first flexible container, the first flexible container can better wrap the contents inside the container through its own deformation, so that the air bubbles in the hot-melt base material can be expelled when the follow-up pressurizing and heating process is implemented, and air in the first flexible container is prevented from mixing with the hot-melt base material.

S900: putting the first flexible container and the contents of the first flexible container into an autoclave together, and after the autoclave is sealed, the autoclave is inflated and pressurized, and heating the assembly obtained in step S800 for a predetermined duration;

In this step, the inflation and pressure treatment can be performed before the heat treatment, but in order to improve efficiency, the inflation and pressure treatment and the heat treatment may overlap in time, that is, the heat treatment is performed simultaneously with the inflation and pressure treatment.

S1000: stop heating the assembly obtained in step S900, when the assembly cools to a preset temperature, taking out the semi-finished magnetic interlayer product between the first release film and the second release film.

After cooling, opening autoclave, taking out the first flexible container within which contents are housed, then opening the first flexible container and taking out the contents, uncovering upper shaping mold, and tearing off the first release film and the second release film, the semi-finished magnetic interlayer product is obtained. At this time, the semi-finished magnetic interlayer has hardened, the interlayer base material and the magnetic part are integrated, and the semi-finished magnetic interlayer has a smooth surface.

S1100: cutting the semi-finished magnetic interlayer obtained in step S1000 to obtain a magnetic interlayer with a preset dimension.

In the present embodiment, the outer dimension of the semi-finished magnetic interlayer is greater than the preset outer dimension, and the semi-finished magnetic interlayer produced with the hot pressing process has extruded hot-melt surplus material, after cutting, the semi-finished magnetic interlayer can be used to manufacture protective cases for electronic devices.

Optionally, in some embodiments, in step S300, the interlayer base material in step S100 can be laid on the lower shaping mold without using the first release film, optionally, in some embodiments, in Step S600, the upper shaping mold can be covered on the upper surface of the assembly obtained in step S400 without using the second release film.

The manufacturing method of the magnetic interlayer of the present application adopts the interlayer base material provided with reinforcing fiber yarn, and offers the through installation hole on the interlayer base material, the magnetic part is embedded in the installation hole, the initial thickness of the magnetic interlayer is small. The obtained assembly is clamped in the shaping molds, then the assembly and the shaping molds are put into a flexible container, the flexible container is sealed after air extraction, then the flexible container and the content inside are put into an autoclave for heat pressing treatment, so that the hot-melt base material contained in the interlayer base material can flow sufficiently, fill into the gap between the installation hole and the magnetic part, and because atmospheric pressure is transmitting through the shaping molds (upper shaping mold and lower shaping mold), and reinforced fiber yarn restricts the flow deformation of the hot-melt base material, while ensuring the distribution force, it can ensure the flatness of the semi-finished magnetic interlayer product during the hot pressing process, so that after cooling, the interlayer base material and the magnetic part are integrated and the resulted sheet material has a smooth surface. The manufacturing method of the magnetic interlayer of the present application adopts the interlayer base material with reinforced fiber yarn, clamping and outgassing are performed on the semi-finished product before the heat pressing treatment. The magnetic interlayer thus prepared has a small thickness, a firm structure and is not prone to deformation, it can be used for the manufacture of electronic device protective cases. The magnetic interlayer can obtain thinner electronic device protective cases without impression of magnetic part, and achieve improved appearance and texture.

Figure 3:
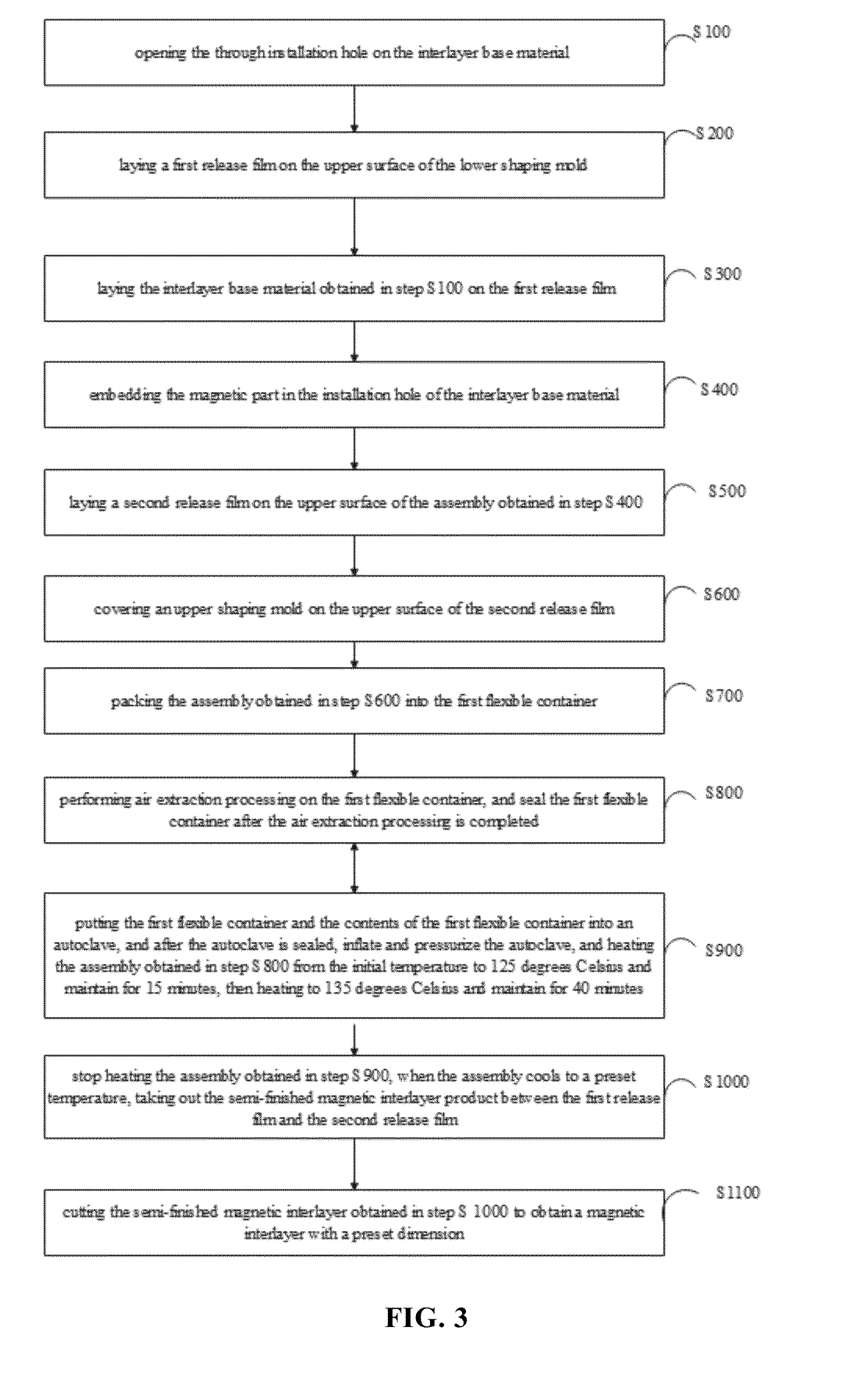
FIG. 3 is the schematic flowchart of the second embodiment of the manufacturing method of magnetic interlayer of the present application.

Further, reinforced fiber yarn is glass fiber yarn, and hot-melt base material is resin; FIG. 3 is the schematic flowchart of the second embodiment of the manufacturing method of magnetic interlayer of the present application, with reference to FIG. 3, in the second embodiment, in step S900, the heating the components obtained in step S800 for a predetermined duration specifically includes:

The assembly obtained in step S800 is heated from the initial temperature to 125 degrees Celsius and maintained for 15 minutes, and then heated to 135 degrees Celsius and maintained for 40 minutes.

In the present embodiment, glass fiber yarn is a common material, which is easy to obtain and low in cost, and it can ensure sufficient strength when applied to the interlayer base material. Resin, such as epoxy resin, is a commonly used material in the electrical field. Compared with the interlayer base material made of pure resin, mixing the glass fiber yarn with the resin can manage the flow of the resin in the heated state, thereby ensuring the thickness stability of the interlayer base material. When heating, the assembly is initially heated at a relatively low temperature, so that the assembly can be heated evenly, and the hot-melt resin can slowly bond or fill the gap, thereby avoiding large deformation. Then increase the temperature to 135 degrees, so that the resin can be fully leveled to obtain a smooth surface. Compared with polycarbonate and other materials, glass fiber yarn has an advantage on ductility and is not easy to deform, it is suitable to be used as an interlayer base material. Compared with aramid fiber materials, glass fiber yarn is cheaper and easier to obtain, and a single layer of glass fiber yarn can be as thin as 0.1 mm, glass fiber yarn can be combined and stacked by multiple layers so that the total thickness is equivalent to the thickness of the magnetic part, while the thinnest aramid fiber is 0.25-0.3 mm.

Figure 4:
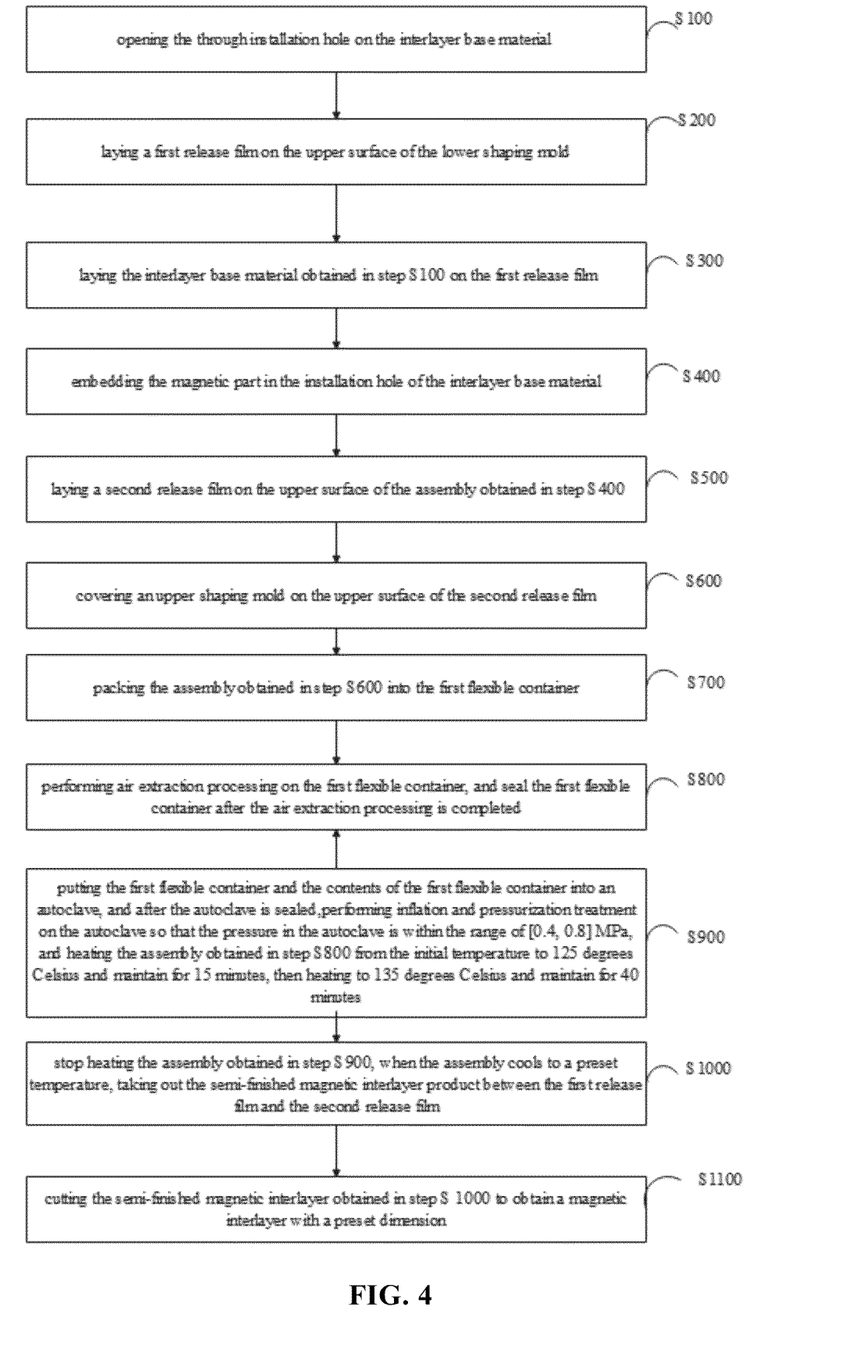
FIG. 4 is the schematic flowchart of the third embodiment of the manufacturing method of magnetic interlayer of the present application.
Figure 5:
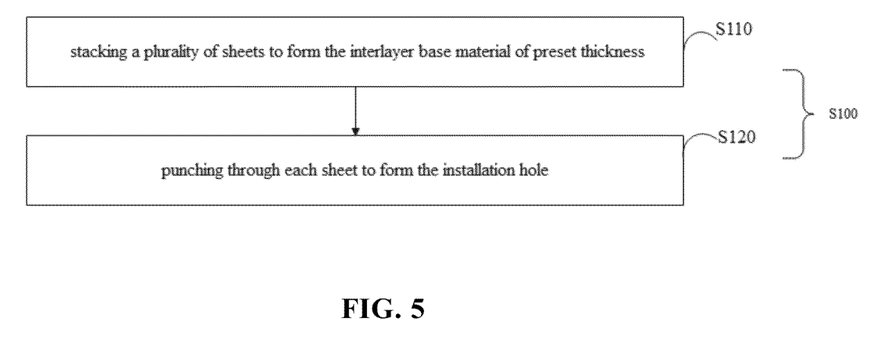
FIG. 5 is a schematic flow diagram illustrating the details of step S100 of another embodiment of the manufacturing method of the magnetic interlayer of the present application.

Further, FIG. 4 is a schematic flowchart of the third embodiment of the manufacturing method of the magnetic interlayer of the present application, with reference to FIG. 4, in the third embodiment, in step S900, the process of inflating and pressurizing the autoclave specifically includes: performing inflation and pressurization treatment on the autoclave so that the pressure in the autoclave is within the range of [0.4, 0.8] MPa.

In the present embodiment, by raising the pressure in the autoclave to a preferred range of values, a distribution force of a suitable size is exerted on the shaping mold, and the hot-melt base material can flow laterally in an extensive manner.

Further, the lower shaping mold and the upper shaping mold are plate-shaped; the first flexible container is a metal foil bag, and in an empty exhaust state, the first flexible container is sheet-shaped.

The two shaping molds are arranged in a plate shape, so that the stacking space occupied is relatively small and uniform pressure can be applied to the assembly between the shaping lower mold and the shaping upper mold. It can be understood that, in order to realize mass production, a material rack can be set in the autoclave, and then multiple sets of shaping molds can be placed on the material rack. The metal foil bag is not only easy to deform, but also heat-resistant and heat-conducting, after the hot pressing is completed, the first flexible container can be cut open to take out the contents, and the used metal foil bag can be recycled. Since the first flexible container is in the form of a sheet in an empty exhaust state, it is not easy to form wrinkles due to the combined use of the plate-shaped lower shaping mold and upper shaping mold. Preferably, the first flexible container is a tin foil bag.

Further, with reference to FIG. 1, in a schematic embodiment, the interlayer base material includes a plurality of mutually stacked sheets, the sheets include hot-melt base material and reinforced fiber yarn contained in the hot-melt base material, the installation hole 32 includes an annular hole 321, referring to FIG. 4, in one embodiment, step S100 specifically includes:

Step S110: stacking a plurality of sheets to form an interlayer base material of preset thickness;

Step S120: punching through each sheet to form installation hole.

In the present embodiment, since the installation hole comprises an annular hole, therefore, a detachable "island" will be formed on the inner side of the interlayer base material, if the through hole is first punched out on each sheet, the individual sheets are then superimposed, in that case not only the individual through holes are aligned to form the installation hole, but also separable island portions are aligned. By superimposing multiple sheets together before punching out the installation hole, alignment process is eliminated, which makes the manufacturing process simpler.

Further, with reference to FIG. 1, in a schematic embodiment, the magnetic part 33 includes a main absorbing part 332, and the main absorbing part 332 includes a plurality of main magnetic attractors and the plurality of main magnetic attractors are connected to form a ring shape annular membrane; S400 specifically includes:

Embedding the main absorbing part in the annular hole of the interlayer base material. The annular film may be removed after the embedding of the main absorbing part.

By first connecting a plurality of main magnetic attractors with an annular film, the main absorbing part 331 can be accurately and quickly mounted into the installation hole. The ring-shaped main absorbing part 331 can surround and form a wireless charging area, which is convenient for charging the electronic device while using the electronic device protective case.

With reference to FIG. 1, in schematic embodiment, magnetic part 33 also comprises an auxiliary absorbing part 332 that is used to help positioning, and installation hole 32 also comprises magnetic positioning hole 322, and the auxiliary absorbing part 332 is installed in the magnetic positioning hole 322.

The present application also proposes a manufacturing method of a protective case for electronic device. With reference to FIG. 1, in an exemplary embodiment, the protective case for electronic device includes an inner shell 10, an outer shell 20 and an magnetic interlayer 30 between the inter shell and the outer shell. The electronic device may be a mobile phone or a tablet computer, or other portable electronic devices. By providing the magnetic interlayer 30, the electronic device protective case and the electronic device placed therein can be conveniently mounted on the bracket or the charging device. The material of the inner shell 10 and the outer shell 20 may be plastic or metal, which is not limited in this application. The inner shell 10 and the outer shell 20 may be in the final shape or in an intermediate shape requiring further processing. In an embodiment of the final form of the inner shell 10 and the outer shell 20, both the inner shell 10 and the outer shell 20 include a bottom wall and a side wall arranged on the outer edge of the bottom wall, thereby forming a cavity open on one side.

Figure 6:
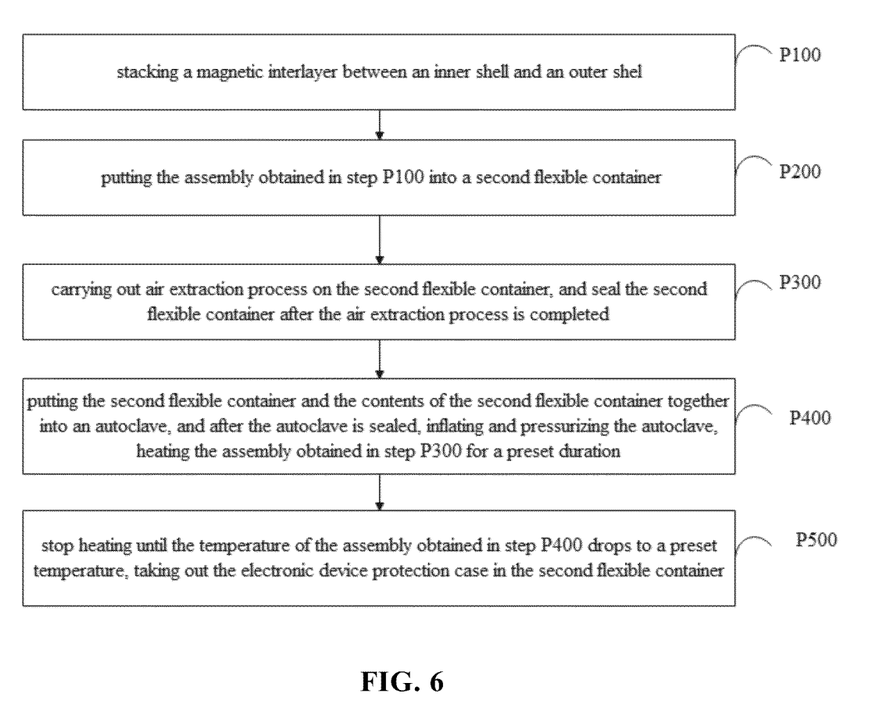
FIG. 6 is a schematic flowchart of the first embodiment of the manufacturing method of the electronic device protective case of the present application.

FIG. 6 is a schematic flow chart of a first embodiment of the manufacturing method of the electronic device protective case of the present application, with reference to FIG. 6, in this first embodiment, the manufacturing method of the electronic device protective case comprises:

P100: A magnetic interlayer is stacked between an inner shell and an outer shell, and the magnetic interlayer is a magnetic interlayer manufactured by the manufacturing method of the magnetic interlayer in any of the above embodiments. The specific manufacturing process of the manufacturing method of the magnetic interlayer are described in the above-mentioned embodiments. Since the manufacturing method of the electronic device protective case adopts all the technical solutions of the above-mentioned embodiments, it also has all the benefits brought by the technical solutions of the above-mentioned embodiments, which will not be repeated here.

P200: putting the assembly obtained in step P100 into a second flexible container;

P300: carrying out air extraction process on the second flexible container, and seal the second flexible container after the air extraction process is completed;

In the same way as the first flexible container, when the second flexible container is degassed, the deformation of the second flexible container can be used to wrap the assembly, so that the air bubbles in the hot-melt base material can be expelled when the follow-up pressurizing and heating process is implemented, and air in the second flexible container is prevented from mixing with the hot-melt base material.

P400: the second flexible container and the contents of the second flexible container together are put into an autoclave, and after the autoclave is sealed, the autoclave is inflated and pressurized, and the assembly obtained in step P300 is heated for a preset duration;

In this step, the inflation and pressure treatment can be performed before the heat treatment, but in order to improve efficiency, the inflation and pressure treatment and the heat treatment may overlap in time, that is, the heat treatment is performed simultaneously with the inflation and pressure treatment. Through pressure and heat treatment, the hot-melt base material of the interlayer base material is softened again and can be fully bonded to the inner shell and the outer shell respectively. In a specific embodiment, the material of the inner shell and the outer shell is similar to that of the interlayer base material, for example, the material of the inner shell and the outer shell are both made of aramid fiber.

P500: stop heating until the assembly obtained in step P400 cools down to a preset temperature, taking out the electronic device protective case in the second flexible container.

In this step, after cooling, the inner shell, the outer shell and the magnetic interlayer are fully bonded together to form an integrated structure.

In the present embodiment, since the initial form of the magnetic interlayer is a sheet with a smooth surface, the magnetic interlayer can have a higher-quality surface contact with the inner shell and the outer shell, and then through sealing it in the second flexible container and extracting air from the second flexible container, it would be ensured that the bonding strength can be guaranteed during the hot pressing process, and no large deformation will occur.

Figure 7:
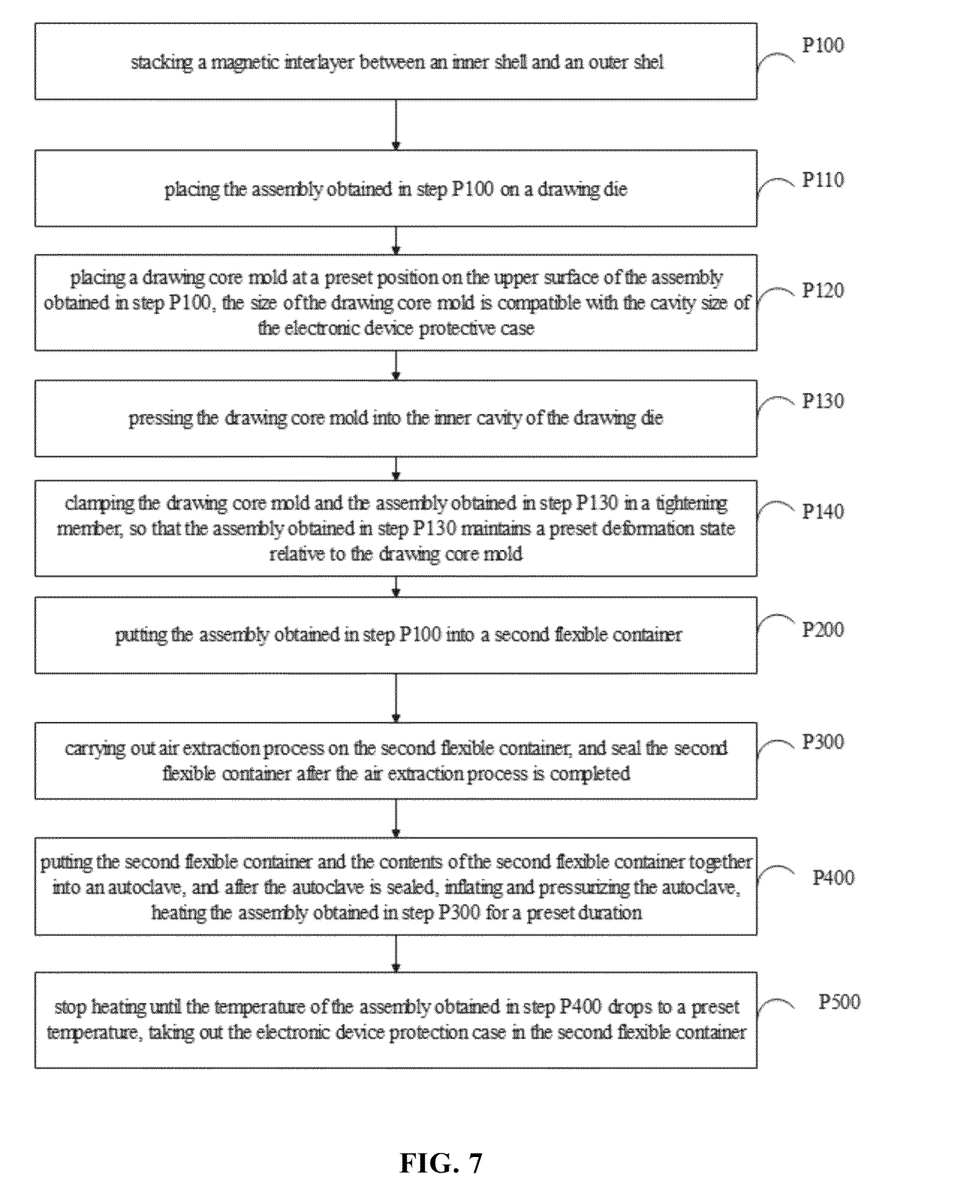
FIG. 7 is a schematic flowchart of the second embodiment of the manufacturing method of the electronic device protective case of the present application.

Further, FIG. 7 is a schematic flowchart of the second embodiment of the manufacturing method of the electronic device protective case of the present application, referring to FIG. 7, in the second embodiment, the initial shapes of the inner layer shell and the outer layer shell are flat plate shapes, the following steps are also included between step P100 and step P200:

P110: the assembly obtained in step P100 is placed on a drawing die;

In this step, the assembly covers the die cavity of the drawing die, it can be understood that, in order to facilitate deep-drawing, inner shell and outer shell are made of deformable material, such as aramid fiber material (Kevlar material).

P120: a drawing core mold is placed at a preset position of the upper surface of the assembly obtained in step P100, the size of the drawing core mold is compatible with the cavity size of the electronic device protective case;

P130: the drawing core mold is pressed into the inner cavity of the drawing die;

Through the drawing process, the assembly forms a cavity for accommodating electronic device.

P140: clamping the drawing core mold and the assembly obtained in step P130 in a tightening member, so that the assembly obtained in step P130 maintains a preset deformation state relative to the drawing core mold;

In this step, the drawing core mold remains in the cavity of the assembly, so that it can coordinate with the tightening member to facilitate the formation of the assembly, and prevent excessive springback deformation of the assembly after drawing.

Step P200 specifically comprises:

Placing the tightening member, the drawing core mold and the assembly obtained in step P130 into the second flexible container.

Further, the tightening member is a silica gel bag, the second flexible container is a tin foil bag, and when in an empty exhaust state, the second flexible container is in sheet shape.

In the present embodiment, silica gel bag has heat resistance feature, it is simple and convenient to use silica gel bag as a tightening member, and silica gel bag can be used in follow-up hot pressing process, it can be understood that, for the convenience of outgassing, silica gel bag does not need to be sealed. Similar to the use of tin foil bag for the first flexible container, the second flexible container also uses tin foil bag, which are deformable, heat-resistant, easy to dismantle and recyclable, and can ensure that the pressure is evenly applied to the contents inside including the assembly.

It should be noted that the description of the above embodiments is for the purpose of illustrating not limiting the technical scheme of the present application. Although the application has been described in detail with reference to the foregoing embodiments, those of ordinary skill in the art will understand that it is possible to modify the technical solutions recorded in the foregoing embodiments, or perform equivalent replacements for some of the technical features, and these modifications or replacements do not break away from the spirit and scope of the technical solutions of the various embodiments of the present application.

What is claimed is:

1. A protective case for electronic device, comprising:
an inner shell;
an outer shell; and
a magnetic interlayer disposed between and in contact with the inner shell and the outer shell, wherein:
the magnetic interlayer includes an interlayer base material and a magnetic part, the interlayer base material including an inner side wall defining a through-hole, and the magnetic part fixed in the through-hole,
the interlayer base material having a base material thickness defining a depth of the through-hole, and the magnetic part having a magnetic part thickness that is equal to the base material thickness and the depth of the through-hole, the interlayer base material comprising a hot-melt base material and reinforcing fiber yarn embedded in the hot-melt base material, the hot-melt base material disposed in contact with the magnetic part along the inner side wall of the through-hole to fix the magnetic part in the through-hole, wherein the magnetic part is fixed in the through-hole and the magnetic interlayer is flattened by applying heat and pressure to the magnetic interlayer to melt the hot-melt base material.

2. The protective case for electronic device according to claim 1, wherein the inner shell and the outer shell have substantially the same ductility level as the reinforcing fiber yarn.

3. The protective case for electronic device according to claim 2, wherein the inner shell, the outer shell and the reinforcing fiber yarn have substantially the same degree of compatibility with resin.

4. The protective case for electronic device according to claim 1, wherein the inner shell and the outer shell are made of aramid fiber, the reinforcing fiber yarn is a glass fiber yarn, and the hot-melt base material is made of resin.

5. The protective case for electronic device according to claim 1, wherein the magnetic interlayer is produced according to the following steps:

S100: opening the through-hole in the interlayer base material;

S200: laying a first release film on an upper surface of a lower shaping mold;

S300: laying the interlayer base material obtained in step S100 on the first release film;

S400: embedding the magnetic part in the through-hole in the interlayer base material to obtain a magnetic part and interlayer base material subasssembly;

S500: laying a second release film on an upper surface of the magnetic part and interlayer base material subassembly obtained in step S400;

S600: putting covering an upper shaping mold on an upper surface of the second release film to obtain a molding subassembly including the interlayer base material, the magnetic part, the first release film, the lower shaping mold, the second release film, and the upper shaping mold;

S700: putting the molding subassembly obtained in step S600 into a first flexible container;

S800: performing air extraction processing on the first flexible container, and sealing the first flexible container after the air extraction processing is completed;

S900: putting the first flexible container and the molding subassembly inside of the first flexible container into an autoclave, sealing the autoclave, inflating and pressurizing the autoclave, and heating the first flexible container and the molding subassembly inside of the first flexible container assembly obtained in step S800 for a predetermined duration;

S1000: stopping the heating after performing the heating for the predetermined duration, waiting for the first flexible container and the molding subassembly inside of the first flexible container to cool to a preset temperature to obtain a semi-finished magnetic interlayer product between the first release film and the second release film, taking out the semi-finished magnetic interlayer product;

S1100: cutting the semi-finished magnetic interlayer obtained in step S1000 to a preset shape and size to obtain the magnetic interlayer.

6. The protective case for electronic device according to claim 5, wherein the reinforcing fiber yarn is a glass fiber yarn, and the hot-melt base material is made of resin;

wherein, in the step S900, the heating of the first flexible container and the molding subassembly inside of the first flexible container for a preset duration includes:

heating the first flexible container and the molding subassembly inside of the first flexible container from an initial temperature to 125 degrees Celsius and maintaining the temperature at 125 degrees Celsius for 15 minutes, then heating to 135 degrees Celsius and maintaining the temperature at 135 degrees Celsius for 40 minutes.

7. The protective case for electronic device according to claim 5, wherein the reinforcing fiber yarn is a glass fiber yarn, and the hot-melt base material is made of resin;

wherein, in the step S900, the heating of the first flexible container and the molding subassembly inside of the first flexible container for a preset duration includes:

heating the assembly obtained in step S800 from the initial temperature to between 100-130 degrees Celsius and maintaining the temperature of between 100-130 degrees Celsius for between 10-20 minutes, then heating to between 130-160 degrees Celsius and maintaining the temperature of between 130-160 degrees Celsius for between 30-50 minutes.

8. The protective case for electronic device according to claim 5, wherein, in the step S900, inflating and pressurizing the autoclave includes: inflating and pressurizing the autoclave so that a pressure in the autoclave is within a range of 0.4 MPa to 0.8 MPa.

9. The protective case for electronic device according to claim 8, wherein the lower shaping mold and the upper shaping mold are both plate-shaped.

10. The protective case for electronic device according to claim 9, wherein the first flexible container is a metal foil bag, and when the first flexible container is in an empty exhaust state, the first flexible container is sheet-shaped.

11. The protective case for electronic device according to claim 10, wherein the first flexible container is a tin foil bag.

12. The protective case for electronic device according to claim 5, wherein the interlayer base material comprises a plurality of stacked sheets, the sheets include the hot-melt base material and the reinforcing fiber yarn contained in the hot-melt base material; the through-hole is an annular hole, and the step S100 further includes:

Step S110: stacking the plurality of sheets to form the interlayer base material having a preset thickness;

Step S120: punching through each sheet of the plurality of sheets to form the annular hole.

13. The protective case for electronic device according to claim 12, wherein the magnetic part comprises a main adsorption part, the main adsorption part includes a plurality of main magnetic attracting parts and an annular film connecting the plurality of main magnetic attracting parts into a ring shape; and the step S400 includes:
embedding the main adsorption part in the annular hole of the interlayer base material; and
removing the annular film.

14. The protective case for electronic device according to claim 1, wherein the magnetic interlayer is produced according to the following steps:

S100: opening the through-hole in the interlayer base material;

S200: laying the interlayer base material obtained in step S100 on a lower shaping mold;

S300: embedding the magnetic part in the through-hole of the interlayer base material to obtain a magnetic part and interlayer base material subasssembly;

S400: putting an upper shaping mold on an upper surface of the magnetic part and interlayer base material subasssembly assembly obtained in step S300;

S500: putting the magnetic part and interlayer base material subassembly and upper shaping mold into a first flexible container;

S600: performing air extraction processing on the first flexible container, and sealing the first flexible container after the air extraction processing is completed;

S700: putting the first flexible container including the magnetic part and interlayer base material subassembly and upper shaping mold contents inside the first flexible container into an autoclave, sealing the autoclave, inflating and pressurizing the autoclave, and heating the first flexible container including the magnetic part and interlayer base material subassembly and upper shaping mold inside the first flexible container for a predetermined duration;

S800: stopping the heating after performing the heating for the predetermined duration, waiting for the first flexible container including the magnetic part and interlayer base material subassembly and upper shaping mold inside the first flexible container to cool to a preset temperature to obtain a semi-finished magnetic interlayer product;

S900: cutting the semi-finished magnetic interlayer obtained in step S800 to a preset shape and size to obtain the magnetic interlayer.

15. The protective case for electronic device according to claim 1, wherein the inner shell, the outer shell and the reinforcing fiber yarn are made of aramid fiber, the hot-melt base material is made of resin.

16. The protective case for electronic device according to claim 1, wherein a thickness of the inner shell is 0.25 mm-0.5 mm, a thickness of the outer shell is 0.25 mm-0.5 mm, and a thickness of the magnetic interlayer is 0.1 mm-0.5 mm.

* * * * *